(12) United States Patent
Fiebel et al.

(10) Patent No.: US 9,723,845 B2
(45) Date of Patent: Aug. 8, 2017

(54) DISPENSING GUN

(71) Applicant: Helen of Troy Limited, Belleville, St. Michael (BB)

(72) Inventors: William Fiebel, Succasunna, NJ (US); Paul Robert Lacotta, Tenafly, NJ (US); Conor McNamara, Montclair, NJ (US)

(73) Assignee: Helen of Troy Limited, Belleville, St. Michael (BB)

( * ) Notice: Subject to any disclaimer, the term of this patent is extended or adjusted under 35 U.S.C. 154(b) by 168 days.

(21) Appl. No.: 14/569,011

(22) Filed: Dec. 12, 2014

(65) Prior Publication Data

US 2016/0167082 A1 Jun. 16, 2016

(51) Int. Cl.
*B67D 7/58* (2010.01)
*A21C 15/00* (2006.01)
*B05C 17/01* (2006.01)

(52) U.S. Cl.
CPC .......... *A21C 15/005* (2013.01); *B05C 17/013* (2013.01); *B05C 17/0126* (2013.01)

(58) Field of Classification Search
CPC ...................... B05C 17/00576; B05C 17/0116
USPC ................................................. 222/326, 391
See application file for complete search history.

(56) References Cited

U.S. PATENT DOCUMENTS

| | | | |
|---|---|---|---|
| 795,713 A * | 7/1905 | Letts .......................... | F16N 3/08 222/323 |
| 3,029,653 A * | 4/1962 | Nilsson ............... | B05C 17/0126 222/391 |
| 4,231,368 A | 11/1980 | Becker | |
| 4,289,257 A * | 9/1981 | Herb ................... | B05C 17/0053 222/146.5 |
| 4,339,058 A | 7/1982 | Wendt | |
| 4,378,076 A * | 3/1983 | Stirnweiss .......... | B05C 17/0053 222/146.5 |
| 4,523,705 A | 6/1985 | Belanger | |
| 4,566,610 A | 1/1986 | Herb | |
| 4,637,745 A | 1/1987 | Speisebecher et al. | |
| 4,813,574 A * | 3/1989 | Hwan ................. | B05C 17/0123 222/325 |
| 5,390,831 A | 2/1995 | Schneider | |
| 5,499,548 A * | 3/1996 | Keller ................. | B05C 17/0126 222/391 |

(Continued)

OTHER PUBLICATIONS

International Search Report filed in PCT/US15/64709 mailed Feb. 5, 2016.

(Continued)

*Primary Examiner* — Patrick M Buechner
*Assistant Examiner* — Michael J Melaragno
(74) *Attorney, Agent, or Firm* — Rankin, Hill & Clark LLP (57) ABSTRACT

A dispensing gun assembly includes a frame, a rod, a piston, a driver, a trigger, and a linkage. The rod slideably connects with the frame for linear movement with respect to the frame. The piston connects with the rod for movement with the rod. The driver selectively engages with the rod to move the rod in a linear direction when engaged with the rod. The trigger slideably connects with the frame. The linkage connects the trigger with the driver such that linear movement of the trigger with respect to the frame in a rearward direction results in the driver engaging the rod and linear movement of the rod and the piston in a forward direction.

17 Claims, 8 Drawing Sheets

(56) References Cited

U.S. PATENT DOCUMENTS

| | | | |
|---|---|---|---|
| 6,286,718 B1 | 9/2001 | Durrant | |
| 6,460,736 B1 | 10/2002 | D'Agostino | |
| 6,827,701 B2* | 12/2004 | MacMahon | A61M 1/0009 604/121 |
| 8,251,260 B2 | 8/2012 | Hung | |
| 8,297,481 B2 | 10/2012 | Jalali et al. | |
| 2005/0085769 A1* | 4/2005 | MacMahon | A61M 1/0009 604/96.01 |
| 2006/0276743 A1 | 12/2006 | MacMahon et al. | |
| 2007/0102457 A1* | 5/2007 | Campbell | B05C 17/0103 222/333 |
| 2007/0119865 A1 | 5/2007 | Belanger | |
| 2008/0060970 A1* | 3/2008 | Wheeler | A61B 17/00491 206/570 |
| 2008/0121657 A1 | 5/2008 | Voegele et al. | |
| 2009/0134187 A1* | 5/2009 | Hefele | B05C 17/0126 222/391 |
| 2009/0272767 A1* | 11/2009 | Herman | G01F 11/026 222/326 |
| 2009/0302055 A1* | 12/2009 | Cadden | B05C 17/00506 222/1 |
| 2012/0160877 A1* | 6/2012 | Brummitt | A61C 5/062 222/391 |
| 2013/0233892 A1* | 9/2013 | Kimura | B65D 83/0033 222/333 |
| 2015/0209821 A1* | 7/2015 | Pfahnl | A61M 1/0064 222/1 |

OTHER PUBLICATIONS https://www.nordicware.com/store/product_detail/deluxe-frosting-decorator-set (Feb. 20, 2014).

\* cited by examiner

DISPENSING GUN

BACKGROUND

Dispensing guns are used to dispense flowable materials such as caulk, cement, plastics, and adhesives. Similar dispensing guns are also used to dispense icing or frosting on cakes, and these types of dispensing guns can also be referred to as decorating or frosting guns.

Known dispensing guns typically include a nozzle at one end and a trigger mechanism at the other end. The trigger mechanism includes a trigger that pivotally connects with a frame of the dispensing gun. The trigger is pivoted with respect to the frame to dispense the material from the dispensing gun. This pivoting action can become uncomfortable for an operator of the dispensing gun, and the pivoting action can make it difficult to accurately dispense a desired amount of flowable material from the dispensing gun.

SUMMARY

In view of the foregoing, a dispensing gun assembly includes a frame, a rod slideably connected with the frame, a piston connected with the rod, a driver selectively engageable with the rod, a trigger slideably connected with the frame, and a linkage connecting the trigger with the driver. The rod slideably connects with the frame for linear movement with respect to the frame. The piston connects with the rod for movement with the rod. The driver selectively engages with the rod to move the rod in a linear direction when engaged with the rod. The trigger slideably connects with the frame. The linkage connects the trigger with the driver such that linear movement of the trigger with respect to the frame in a rearward direction results in the driver engaging the rod and linear movement of the rod and the piston in a forward direction.

DETAILED DESCRIPTION

Figure 1:
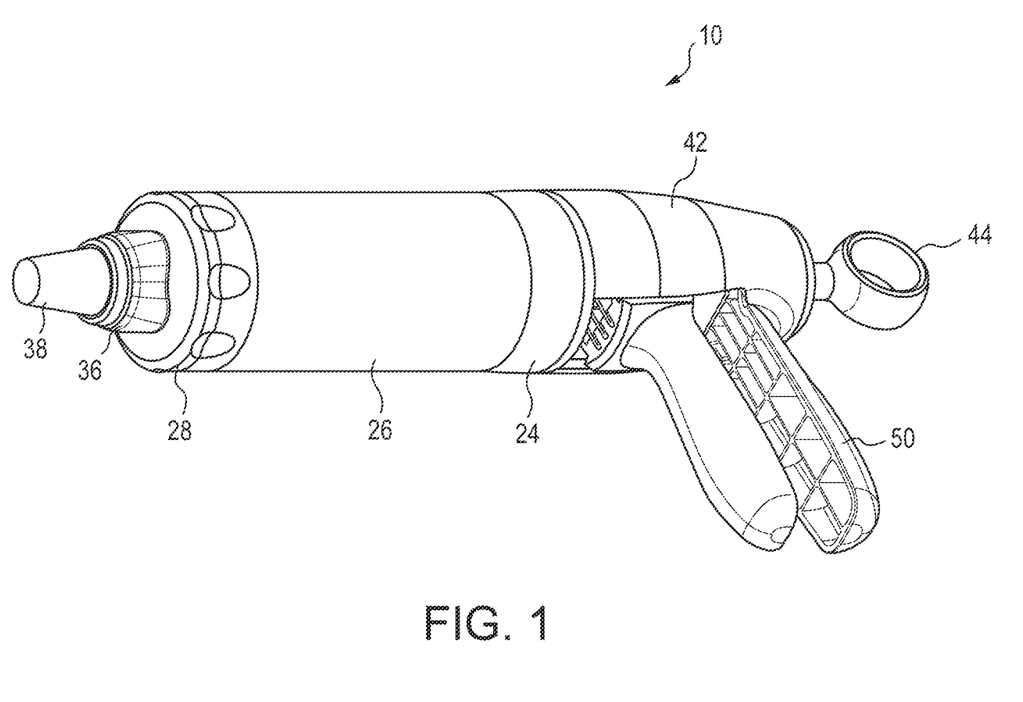
FIG. 1 is a perspective view of a dispensing gun.
Figure 2:
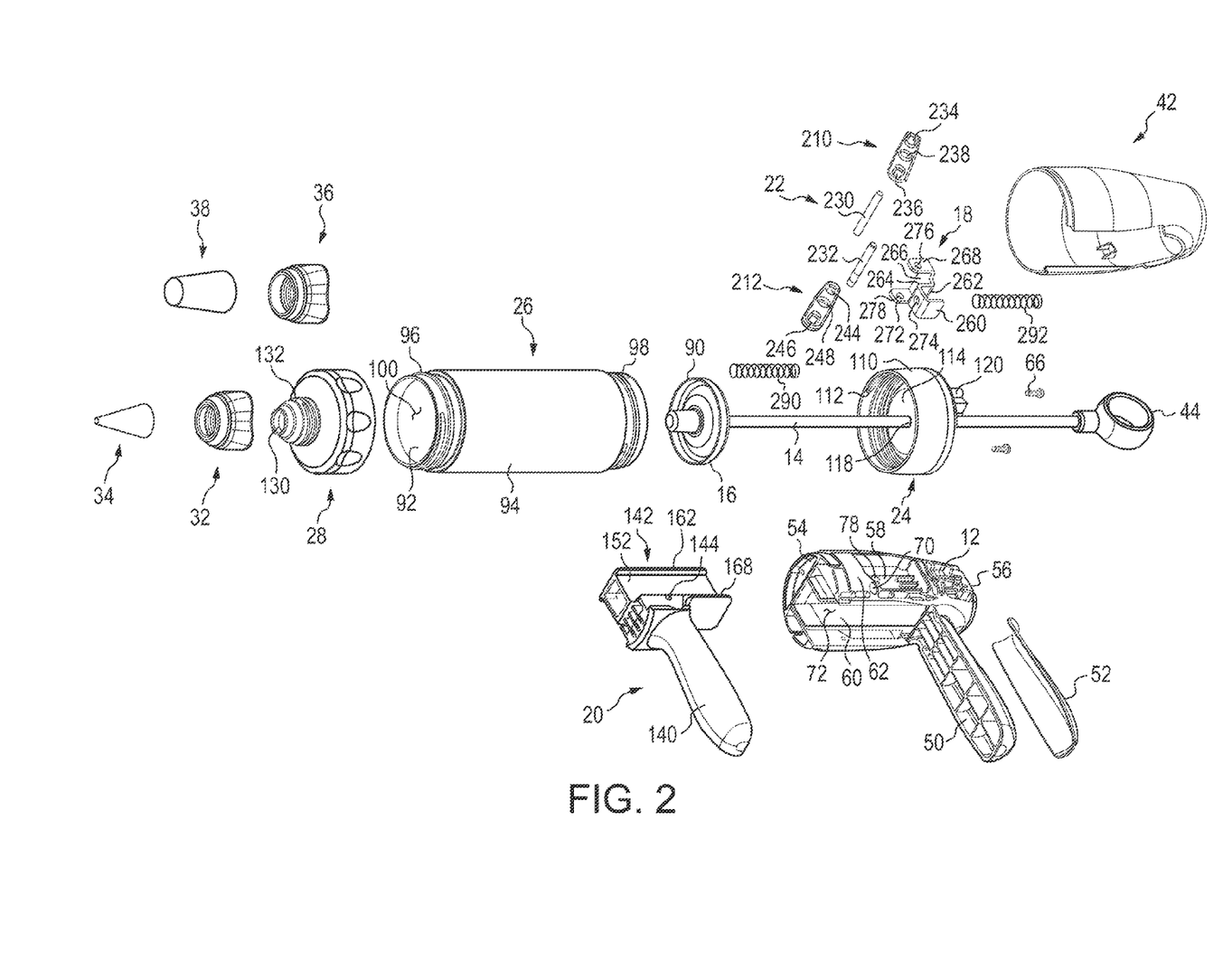
FIG. 2 is an exploded view of the dispensing gun depicted in FIG. 1.

FIG. 1 depicts a dispensing gun 10 that is useful to dispense icing and frosting on cakes and pastries, for example. The dispensing gun 10 could be modified to dispense other flowable materials. With reference to FIG. 2, the dispensing gun includes a frame 12, a rod 14 slideably connected with the frame, a piston 16 connected with the rod 14, a driver 18 selectively engageable with the rod 14, a trigger 20 slideably connected with the frame 12, and a linkage 22 connecting the trigger 20 with the driver 18. The dispensing gun 10 further includes a collar 24 connected with the frame 12, a tube 26 connected with the collar 24, and a tube cap 28 connected with the tube 26. The dispensing gun 10 further includes a first (small) cap 32 that connects with the tube cap 28 and a first (small) tip 34 that connects with the small cap 32. Also provided with the dispensing gun 10 is a second (large) cap 36 that can also connect with the tube cap 28 and a second (large) tip 38 that connects with the large cap 36. Either the small cap 32 and the small tip 34 attach to the tube cap 28 or the large cap 36 and the large tip 38 connect with the tube cap 28. The dispensing gun 10 further includes a cover 42 that connects with and covers the frame 12 and a knob 44 that connects with the rod 14.

The dispensing gun 10 further includes a fixed handle 50 fixedly connected with the frame 12. In the illustrated embodiment, the frame 12 and the fixed handle 50 are made of plastic and integrally formed with one another. The fixed handle 50 could attach with the frame 12 in other conventional manners; however, the handle 50 is fixed in that it does not move with respect to the frame 12. A grip 52, which can be made from a resilient material, attaches to the fixed handle 50.

Figure 4:
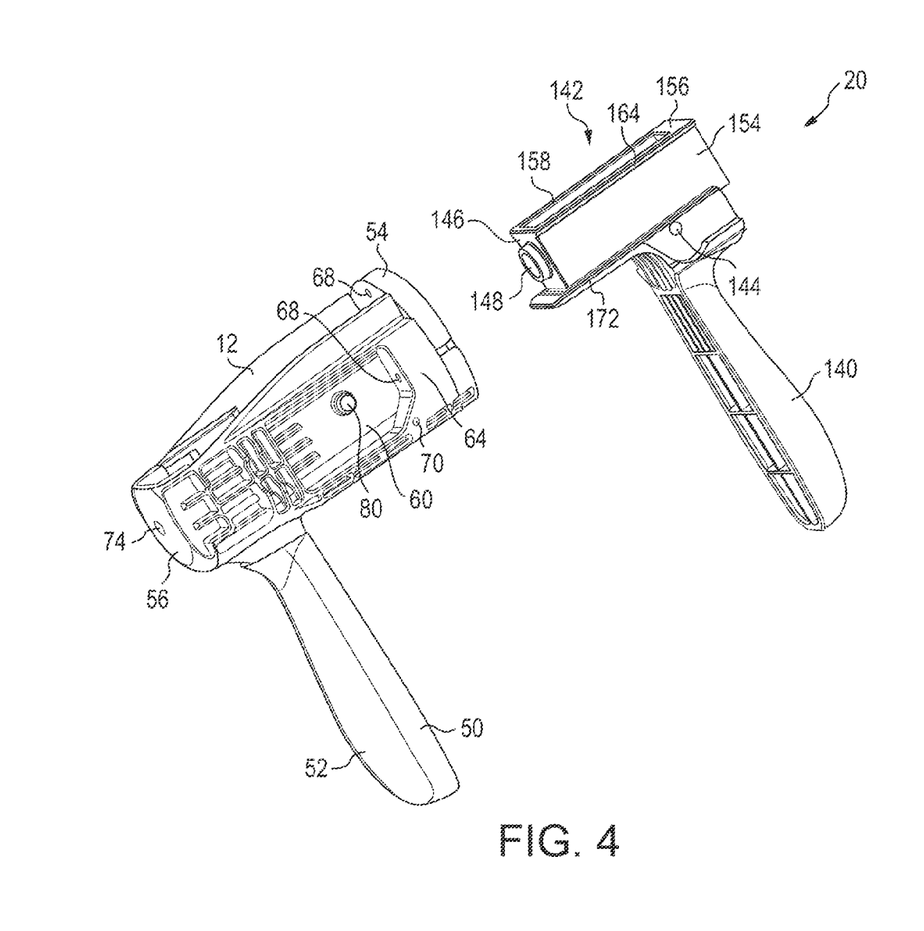
FIG. 4 is a perspective view of a frame and a trigger of the dispensing gun depicted in FIG. 1.
Figure 5:
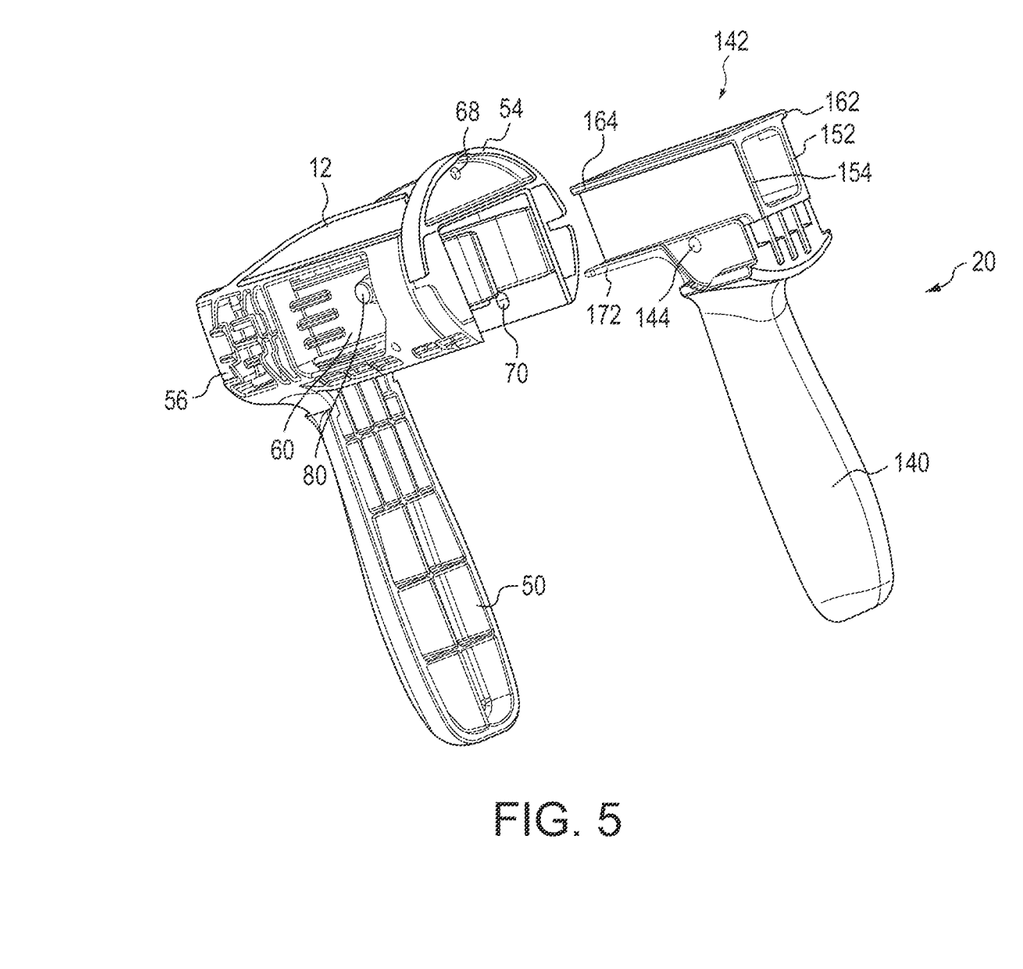
FIG. 5 is another perspective view of the frame and the trigger depicted in FIG. 5.

The frame 12 also includes a forward section 54, which is semi-cylindrical in configuration, a rear section 56, a first sidewall 58, and a second sidewall 60 (FIG. 4). The frame 12 further includes a first lower support 62 (FIG. 2) and a second lower support 64 (FIG. 4). The lower supports 62, 64 extend rearwardly from the forward section 54 and the first lower support 62 is on the same side of the frame 12 as the first sidewall 58 and the second lower support 64 is on the same side as the second sidewall 60. With reference back to FIG. 2, the frame 12 connects with the collar 24 via fasteners 66 that are received in fastener openings 68 formed in the forward section 54 and the lower supports 62, 64. Each of the lower supports 62, 64 also includes an axle hole 70, which extends perpendicular to the rod 14. The first sidewall 58 and a second sidewall 60 extend forward from the rear section 56 toward the forward section 54. The first sidewall 58 is spaced from the second sidewall 60 in a direction perpendicular to the linear direction in which the rod 14 moves so that the frame 12 defines a track 72 between the first sidewall 58 and the second sidewall 60 forward of the rear section 56 to the forward section 54. With reference to FIG. 4, the rear section 56 of the frame 12 includes a central hole 74. The rod 14 is received in and extends through the central hole 74. The rod 14 also extends through the track 72. The frame 12 also includes axles, which are formed as a first post 78 on the first sidewall 58 and a second post 80 formed on the second sidewall 60.

The rod 14 is slideably connected with the frame 12 for linear movement in an axial direction with respect to the frame 12. The rod 14 includes a forward end (not visible) connected with the piston 16 and a rear end (not visible) connected with the knob 44. The rear end of the rod extends rearward of the frame 12. The knob 44 is configured to be pulled in a rearward direction to pull the piston 16 rearward toward the collar 24 so that an operator of the dispensing gun can load material into the tube 26.

The piston 16 connects with the rod 14 for movement with the rod 14. In the illustrated embodiment, the piston 16 is circular. In a cross section taken normal to the linear direction in which the rod 14 and piston 16 move, the tube 26 is also circular and a peripheral edge 90 of the piston contacts an inner surface 92 of the tube. The piston 16 can take other configurations to match the inner surface 92 of the tube 26. The piston 16 is also moveable in a linear direction with the movement of the rod 14 in the same linear direction. When the tube 26 is connected with the collar 24, the piston 16 is received in either the collar 24 or the tube 26.

The tube 26 includes a central section 94, a forward section 96, which is externally threaded, and a rear section 98, which is also externally threaded. The tube 26 is cylindrical and the inner surface 92 is circular in a cross section taken normal to the linear direction in which the rod 14 moves. The tube 26 defines a hollow interior space 100 in which material is loaded, and it is this material that is dispensed from the dispensing gun 10. The tube 26 is selectively connectable to the collar 24 by way of a threaded connection. Alternatively, the tube 26 can connect with the collar 24 in other conventional manners.

Figure 3:
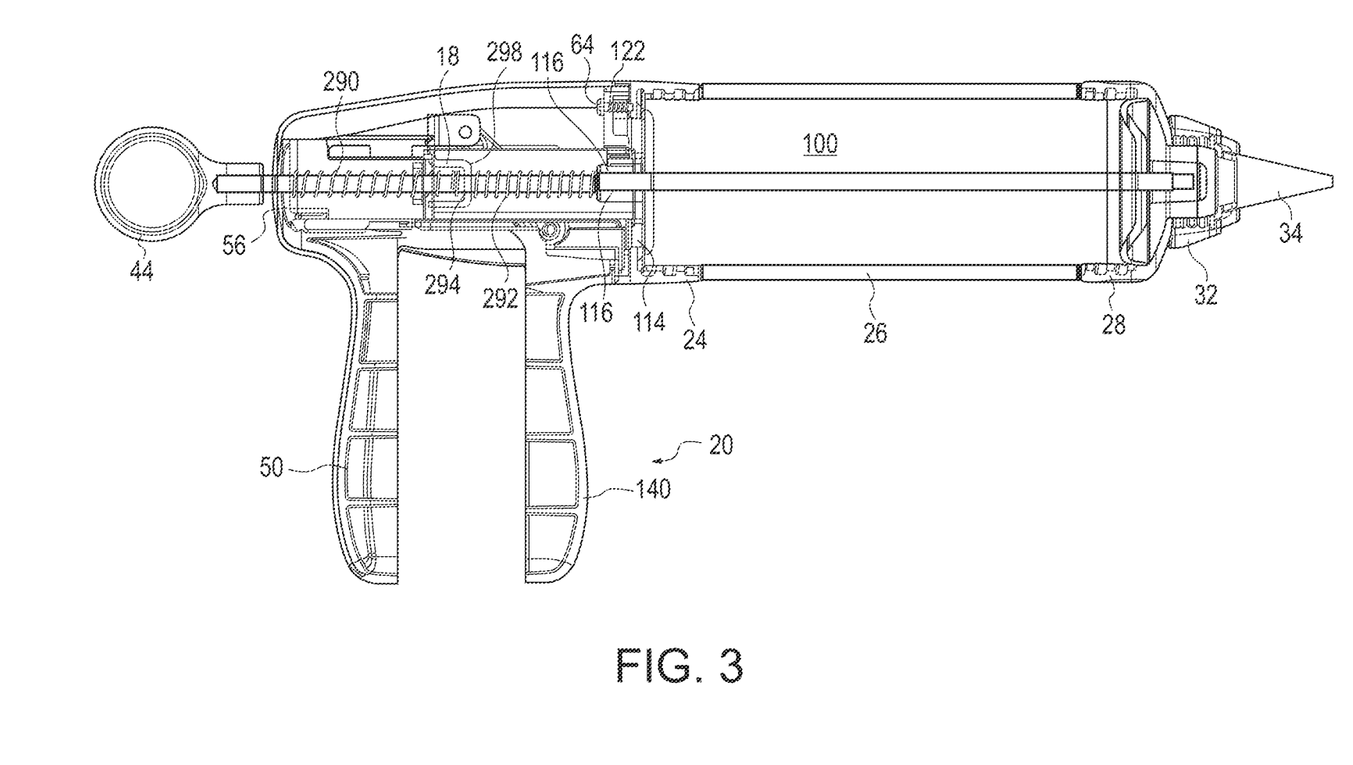
FIG. 3 is a side cross-sectional view of the dispensing gun depicted in FIG. 1.

The collar 24 includes a cylindrical sidewall 110 having internal threads 112 to mate with the rear section 98 of the tube 26. The collar 24 also includes a circular rear wall 114. The collar 24 connects with the tube 26 to close off a rear end of the tube 26. With reference to FIG. 3, a central boss 116 extends rearwardly from the rear wall 114 of the collar 24 and includes a central opening 118. The rod 14 is received in and extends through the central opening 118. First and second supports (only the first support 120 is visible in FIG. 2) also extend rearwardly from the rear wall 114 of the collar 24. The first support 120 aligns with the first sidewall 58 of the frame 12 and the second support (not visible) aligns with the second sidewall 60 of the frame when the collar 24 is connected with the frame 12. Since the first support 120 is spaced from the second support the same distance that the first sidewall 58 is spaced form the second sidewall 60, the supports further define the track 72 in the frame 12. Fastener openings 122 (FIG. 3) that receive the fasteners 66 extend through the collar 24 to connect the frame 12 with the collar 24.

The tube cap 28 connects with the tube 26 at the forward section 96. The tube cap 28 includes an internally threaded section (not visible) to thread onto the tube 26. The tube cap 28 can connect with the tube in other conventional manners. The tube cap 28 includes a through passage 130 that is open to the hollow interior space 100 of the tube 26 when the tube cap 28 is connected with the tube 26. The tube cap 28 also includes a neck 132 that is externally threaded. Each of the caps 32, 36 is internally threaded to thread onto the neck 132. As mentioned above, the small tip 34 connects with the small cap 32 and the large tip 38 connects with the large cap 36. The tips 34, 38 define an outlet opening for the dispensing gun such that when the piston 16 is advanced through the hollow interior space 100 of the tube 26 any material forward of the piston 16 is dispensed through these outlet openings.

Figure 6:
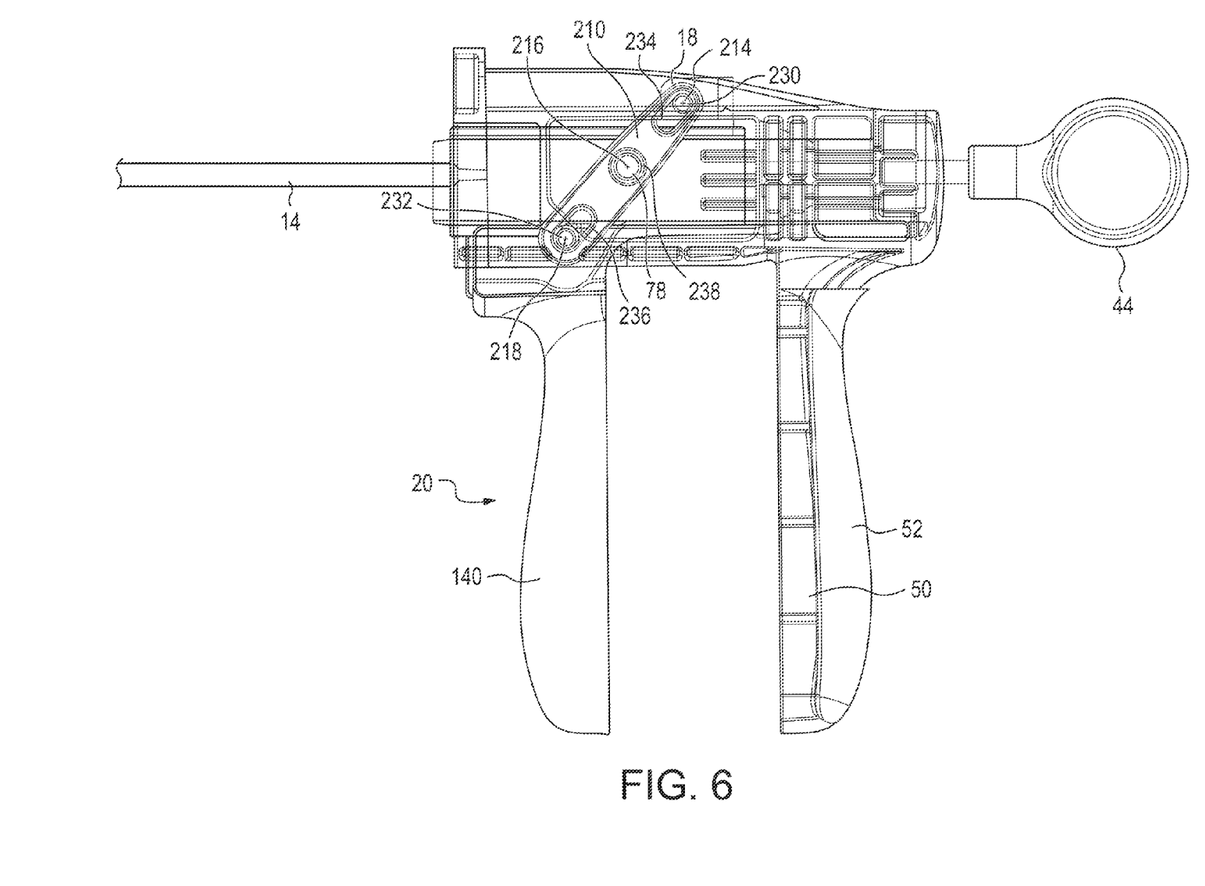
FIG. 6 is a side schematic view of the frame, the trigger, a driver, and a link of the dispensing gun with the trigger in an unsqueezed position.
Figure 7:
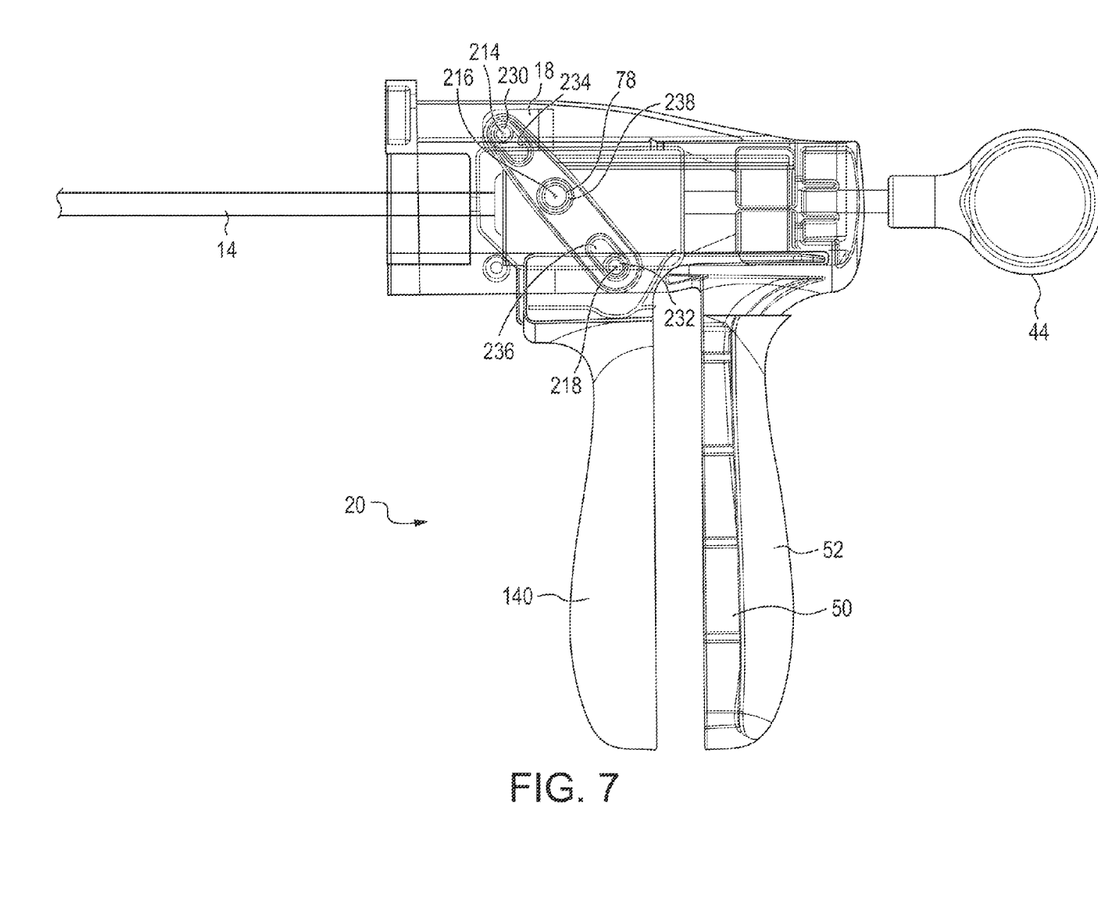
FIG. 7 is a side schematic view similar to FIG. 6 with the trigger in a fully-squeezed position.

The trigger 20 is slideably connected with the frame 12. The trigger 20 includes a grip 140 and a slide 142. In the illustrated embodiment, the grip 140 and the slide 142 are an integrally formed piece of plastic and the grip 140 extends downwardly from the slide 142. The trigger 20 also includes an axle opening 144 positioned between the slide 142 and the grip 140 and extending through the trigger 20 in a direction perpendicular to the linear direction in which the rod 14 moves. With reference to FIG. 4, the slide 142 includes a rear wall 146. The rear wall 146 includes an aperture 148. The rod 14 is received in and extends through the aperture 148 such that the rod is also received in the slide 142. The slide 142 includes a first sidewall 152 (FIG. 2) and a second sidewall 154 (FIG. 4). The slide 142 also includes an upper bridge 156 connecting the first sidewall 152 to the second sidewall 154. The slide 142 also includes an upper opening 158, which allows a lower portion of the driver 18 to be positioned within the upper opening 158 while selectively engaging the rod 14. The slide 142 also includes upper flanges 162 (FIG. 2), 164 (FIG. 4) and lower flanges 168 (FIG. 2), 172 (FIG. 4). The first upper flange 162 is positioned along an upper edge of the first sidewall 152 and the second upper flange 164 is positioned along an upper edge of the second sidewall 154. The first lower flange 168 is positioned along a lower edge of the first sidewall 152 and the second lower flange 172 is positioned along the lower edge of the second sidewall 154. When the slide 142 moves linearly in the track 72, the first upper flange 162 and the first lower flange 168 engage the first sidewall 58 of the frame 12 and the second upper flange 164 and the second lower flange 172 engage the second sidewall 60 of the frame. The slide 142 slides in the track 72 of the frame 12 in a manner to be described in more detail below. When assembled, the fixed handle 50 is positioned rearward of the grip 140 and the grip 140 and the fixed handle 50 are configured to be squeezed to move the grip 140 with respect to the fixed handle 50. The trigger 20, which is disposed forward from the fixed handle 50, is slideable between an unsqueezed position shown in FIGS. 3 and 6, and a fully-squeezed position shown in FIG. 7.

The dispensing gun 10 further includes the driver 18, which is selectively engageable with the rod 14 to move the rod 14 in a linear axial direction when engaged with the rod, and the linkage 22 connecting the trigger 20 with the driver 18. FIG. 2 depicts one example of a linkage 22 connecting the trigger 20 with the driver 18 such that linear movement of the trigger 20 with respect to the frame 12 in a rearward direction, i.e., toward the fixed handle 50, results in the driver 18 engaging the rod 14 and linear movement of the rod 14 and the piston 16 in a forward direction, i.e., toward the tube cap 28 and the outlet of the dispensing gun 10. In the embodiment illustrated in FIGS. 1-7, the linkage 22 includes a link (two links 210, 212 are shown in FIG. 2) pivotally connected with the driver 18. The first link 210 is identical to the second link 212; therefore, the first link 210 will be described with particularity with the understanding that the second link 212 operates in a similar manner. The first link 210 pivots about a first pivot axis 214 with respect to the driver 18. As seen when comparing FIG. 6 to FIG. 7, the first pivot axis 214 moves in a linear direction parallel to the linear direction in which the rod 14 moves as the first link 210 pivots with respect to the driver 18. The first link 210 pivotally connects with the frame 12 such that the first link 210 pivots about a second pivot axis 216 with respect to the frame 12. The first link 210 also pivotally connects with the trigger 20 such that the first link 210 pivots about a third pivot axis 218 with respect to the trigger 20. As seen when comparing FIG. 6 to FIG. 7, the third pivot axis 218 moves in a linear direction parallel to the direction in which the rod 14 moves as the first link 210 pivots with respect to the trigger 20. The linkage 22 provides a mechanical advantage. A first distance measured between the first pivot axis 214 and the second pivot axis 216 is less than a second distance measured between the second pivot axis 216 and a third pivot axis 218.

With reference back to FIG. 2, the linkage 22 further includes a driver axle 230 connecting the driver 18 with the first link 210 and a trigger axle 232 connecting the trigger 20 with the first link 210. The first link 210 includes an upper oblong hole 234 that receives the driver axle 230 and a lower oblong hole 236 that receives the trigger axle 232. The trigger axle 232 is also received through the axle opening 144 in the trigger 20 to connect the first link 210 with the trigger 20. The trigger axle 232 is inserted through the axle hole 70 in the frame 12 when the dispensing gun 10 is assembled, but the trigger axle 232 does not extend into the axle hole 70 when the dispensing gun 10 is finally assembled. The first link 210 also includes a central hole 238 that receives the first axle post 78 on the frame 12 to connect the first link 210 with the frame.

The second link 212 is similar in all respects to the first link 210. The second link 212 includes an upper oblong hole 244 that receives the driver axle 230 and a lower oblong hole 246 that receives the trigger axle 232. The second link 212 also includes a central hole 248 that receives the second axle post 80 on the frame 12. The second link 212 operates in the same manner as the first link 210; therefore, the operation of the second link 212 is not described in further detail.

The driver 18 in the illustrated embodiment is a stamped piece of sheet metal having a base 260, a lower central section 262, an intermediate section 264, a central upper section 266, a first ear 268, and a second ear 272. The lower central section 262 is substantially perpendicular to the base 260 and the intermediate section 264. The lower central section 262 includes a rod opening 274 that is slightly larger in diameter than the rod 14. The central upper section 266 is parallel with the lower central section 262 and is offset rearwardly from the lower central section 262. The first ear 268 is perpendicular to the central upper section 266, and the second ear 272 is spaced from the first ear 268 and perpendicular to the central upper section 266. A first driver axle opening 276 is formed in the first ear 268 and a second driver axle opening 278 is aligned with the first driver axle opening 276 and formed in the second ear 272. The driver axle openings 276, 278 receive the driver axle 230, which is also received in the upper oblong holes 234, 244 in the first and second links 210, 212, respectively.

When the trigger 20, and more specifically the grip 140, and the fixed handle 50 are squeezed, the slide 142 moves in the track 72 in a linear direction rearward. This moves the trigger axle 232 in a linear rearward direction, which is allowed due to the oblong shape of the lower oblong opening 236. This results in the first link 210 pivoting counterclockwise from the orientation shown in FIG. 6 toward the orientation shown in FIG. 7. This pivoting action moves the driver axle 230 in a linear forward direction, which is allowed due to the oblong shape of the upper oblong hole 234. The driver 18 engages the rod 14 when moving in the forward linear direction, as will be described in more detail below.

The dispensing gun 10 also includes a first compression spring 290 and a second compression ring 292. Each compression spring 290, 292 receives the rod 14 and acts against the driver 18. With reference to FIG. 3, the first compression spring 290 acts against the rear section 56 of the frame 12 and a rear surface 294 of the driver 18 and urges the driver 18 toward a position where the driver does not engage the rod, which allows the rod 14 to move within the rod opening 274. The second compression spring 292 acts against the central boss 116 formed on the collar 24 and a forward surface 298 of the driver 18. The second compression spring 292 acts against the driver 18 biasing the driver toward an at-rest position (shown in FIG. 3), and the trigger 20 is in the unsqueezed position when the driver 18 is at the at-rest position. When the trigger 20 is squeezed so that the trigger 20 moves towards the fixed handle 50, the second compression spring 292 is compressed and the driver 18 pivots about the first pivot axis 214 (FIG. 6) so as to engage the rod and drive the rod in a forward direction. When the trigger 20 is released, the second compression spring 292 urges the driver 18 to pivot the driver 18 about the first pivot axis 214 and away from the rod 14, which allows the driver 18 to move with respect to the rod in a rearward direction.

Figure 8:
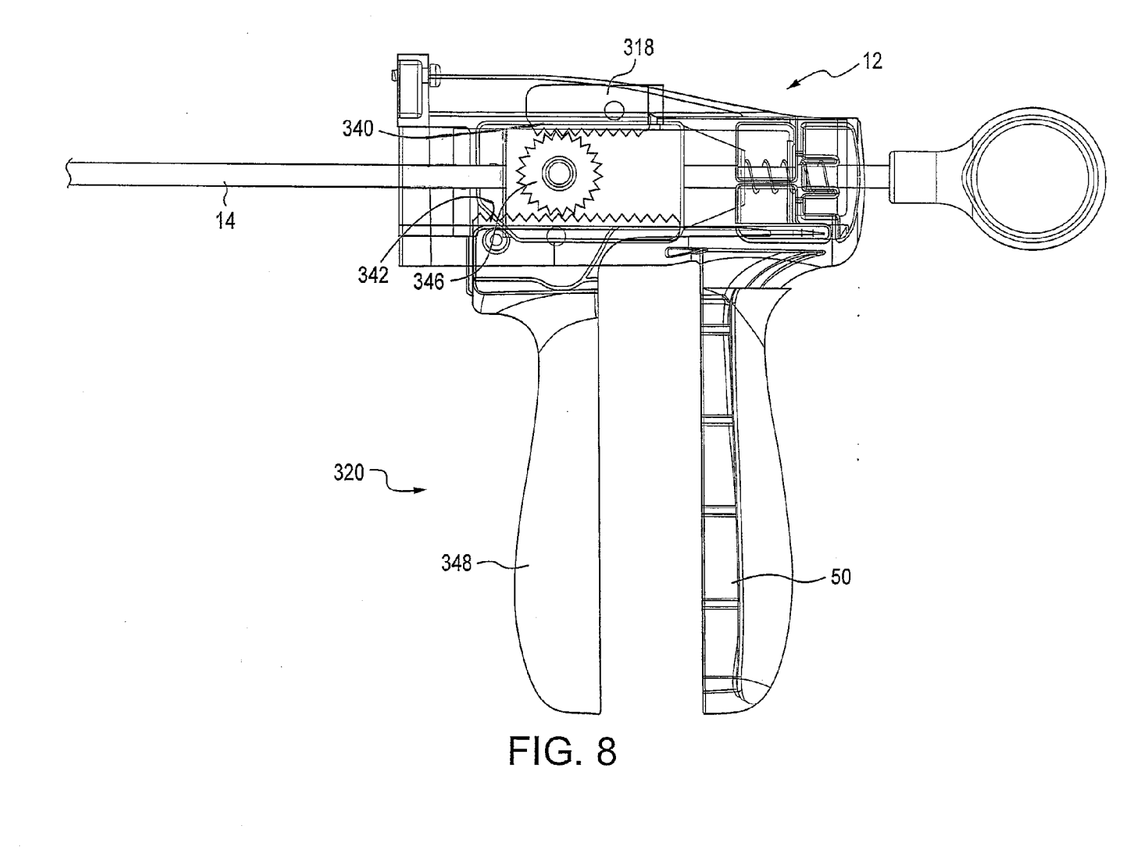
FIG. 8 depicts an alternative embodiment of a linkage connecting the trigger with the driver.

FIG. 8 depicts an alternative linkage connecting a trigger 320, which is similar to the trigger 20 depicted in FIGS. 1-7, with a driver 318, which is similar to the driver 18 depicted in FIGS. 1-7. The driver 318 is selectively engageable with the rod 14 to move the rod in a linear direction when engaged with the rod 14. The driver 318 can include a rod opening similar to the rod opening 274 shown in FIG. 2 so that the rod 14 extends through the rod opening. When the driver 318 is tilted, with respect to the rod 14, similar to being pivoted about the first pivot axis 214 in FIG. 6 as explained above, the driver 318 engages the rod 14 to move the rod 14 in a linear direction. The driver 318 is different than the driver 18 depicted in FIG. 2 in that the driver 318 includes or is connected with a rack 340, which can be located in a location similar to an underside of one of the ears 268, 272 shown in FIG. 2.

The trigger 320 is slideably connected with the frame 12 in a manner similar to the trigger 20 described above. The trigger 320 differs from the trigger 20 shown above in that the trigger includes or is connected with a rack 342. The rack 342 could be formed at a location similar to the upper flanges 162, 164 shown in FIGS. 2 and 4. The trigger 320 would still include a slide 142 and could include the upper opening 158 to allow the driver 18 to be received within the slide and the rod 14 to extend through the slide.

The linkage connecting the trigger 320 with the driver 318 further includes a pinion 346 that can connect with one of the axle posts 78 or 80 on the frame 12. The pinion 346 engages the racks 340, 342. The trigger 320 is disposed forward from the fixed handle 50 and is slideable between an unsqueezed position (similar to the position shown in FIG. 6) and a fully-squeezed position (similar to the position shown in FIG. 7). The trigger 320 includes a grip 348 similar to the grip 140 shown in FIG. 2. The grip 348 and the fixed handle 50 are configured to be squeezed to move the grip 348 with respect to the fixed handle 50. When the grip 348 is moved

The invention claimed is:

1. A dispensing gun assembly comprising:
a frame;
a rod slidably connected with the frame for linear movement with respect to the frame;
a piston connected with the rod for movement with the rod;
a driver including a rod opening receiving the rod, the driver selectively engageable with the rod to move the rod within the rod opening in a linear direction when engaged with the rod;
a trigger slidably connected with the frame;
a fixed handle fixedly connected with the frame, the trigger is disposed forward from the fixed handle and is slidable with respect to the frame between an unsqueezed position and a fully-squeezed position; and
a linkage connecting the trigger with the driver such that linear movement of the trigger in a rearward direction toward the fully-squeezed position results in the driver engaging the rod and linear movement of the rod and the piston in a forward direction,
wherein the frame defines a track and the trigger includes a slide received in the track and a grip extending downwardly from the slide, the grip movable with the trigger such that linear movement of the grip results in movement of the slide in the track, wherein the slide includes an aperture and the rod is received in and extends through the aperture such that the rod is also received in the slide.

2. The dispensing gun assembly of claim 1, further comprising a spring acting against the driver, wherein the spring biases the driver toward an at-rest position, and the trigger is in the unsqueezed position when the driver is in the at-rest position.

3. The dispensing gun assembly of claim 1, further wherein the fixed handle is positioned rearward of the grip, wherein the grip and the fixed handle are configured to be squeezed to move the grip with respect to the fixed handle.

4. The dispensing gun assembly of claim 1, wherein the linkage includes a link pivotally connected with the driver such that the link pivots about a first pivot axis with respect to the driver and the first pivot axis moves in a linear direction as the link pivots with respect to the driver.

5. The dispensing gun assembly of claim 4, wherein the link pivotally connects with the frame such that the link pivots about a second pivot axis with respect to the frame.

6. The dispensing gun assembly of claim 5, wherein the link pivotally connects with the trigger such that the link pivots about a third pivot axis with respect to the trigger and the third pivot axis moves in a linear direction as the link pivots with respect to the trigger.

7. The dispensing assembly of claim 6, wherein a first distance, which is measured between the first pivot axis and the second pivot axis, is less than a second distance, which is measured between the second pivot axis and the third pivot axis.

8. The dispensing assembly of claim 6, wherein the linkage further includes a driver axle connecting the driver with the link and a trigger axle connecting the trigger with the link, wherein the link includes an upper oblong hole that receives the driver axle and a lower oblong hole that receives the trigger axle.

9. The dispensing assembly of claim 8, wherein the frame includes an axle post and the link includes a central hole that receives the axle post.

10. The dispensing gun assembly of claim 1, wherein the linkage includes a rack and pinion arrangement connecting the trigger with the driver.

11. The dispensing gun assembly of claim 1, further comprising a driver axle and a trigger axle, wherein the linkage includes a link having an upper oblong hole that receives the driver axle and a lower oblong hole that receives the trigger axle.

12. The dispensing gun assembly of claim 11, wherein the link pivots with respect to the frame about an axis disposed between the upper oblong hole and the lower oblong hole.

13. The dispensing gun assembly of claim 12, wherein the frame includes an axle post and the link includes a central hole that receives the axle post.

14. A dispensing gun comprising:

a tube for containing a material that is to be dispensed; and the dispensing gun assembly of claim 1, wherein the piston is received in the tube.

15. The dispensing gun assembly of claim 2, wherein the spring is a second spring and further including a first spring acting against the driver, each of the first and second springs receiving the rod.

16. The dispensing gun assembly of claim 15, wherein the first spring acts against a rear section of the frame and a rear surface of the driver and urges the driver toward a position where the driver does not engage the rod, which allows the rod to move within the rod opening.

17. The dispensing gun assembly of claim 16, wherein in a squeezed position of the trigger the second spring is compressed and the driver pivots so as to engage the rod and drive the rod in the linear direction, and wherein in the unsqueezed position of the trigger the second spring pivots the driver away from the rod allowing the driver to move with respect to the rod towards its at-rest position.

* * * * *